Jan. 12, 1943.     E. E. LAKSO     2,307,890
METHOD OF FORMING CASINGS, BAGS, OR THE LIKE
Original Filed Sept. 20, 1935     2 Sheets-Sheet 1
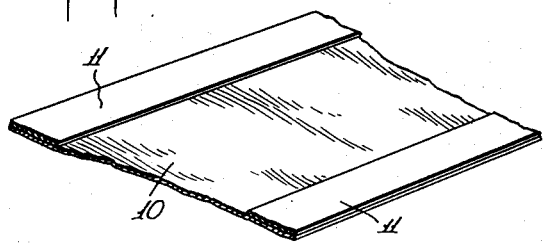
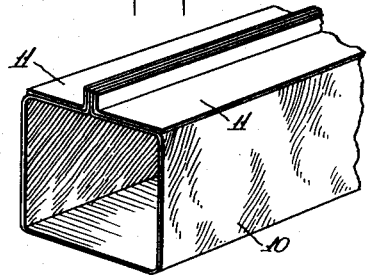
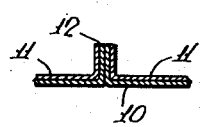
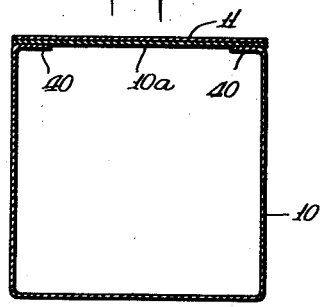
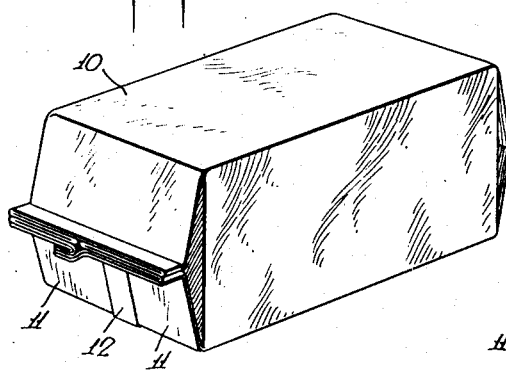
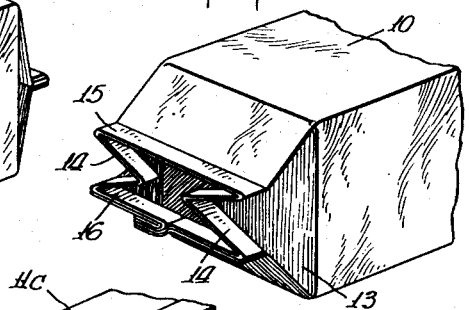
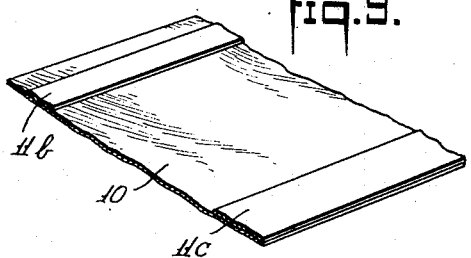
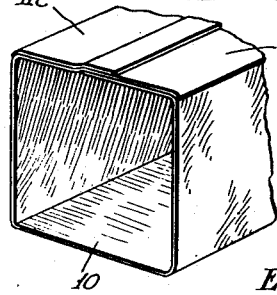
INVENTOR
*Eino E. Lakso*
BY
ATTORNEYS

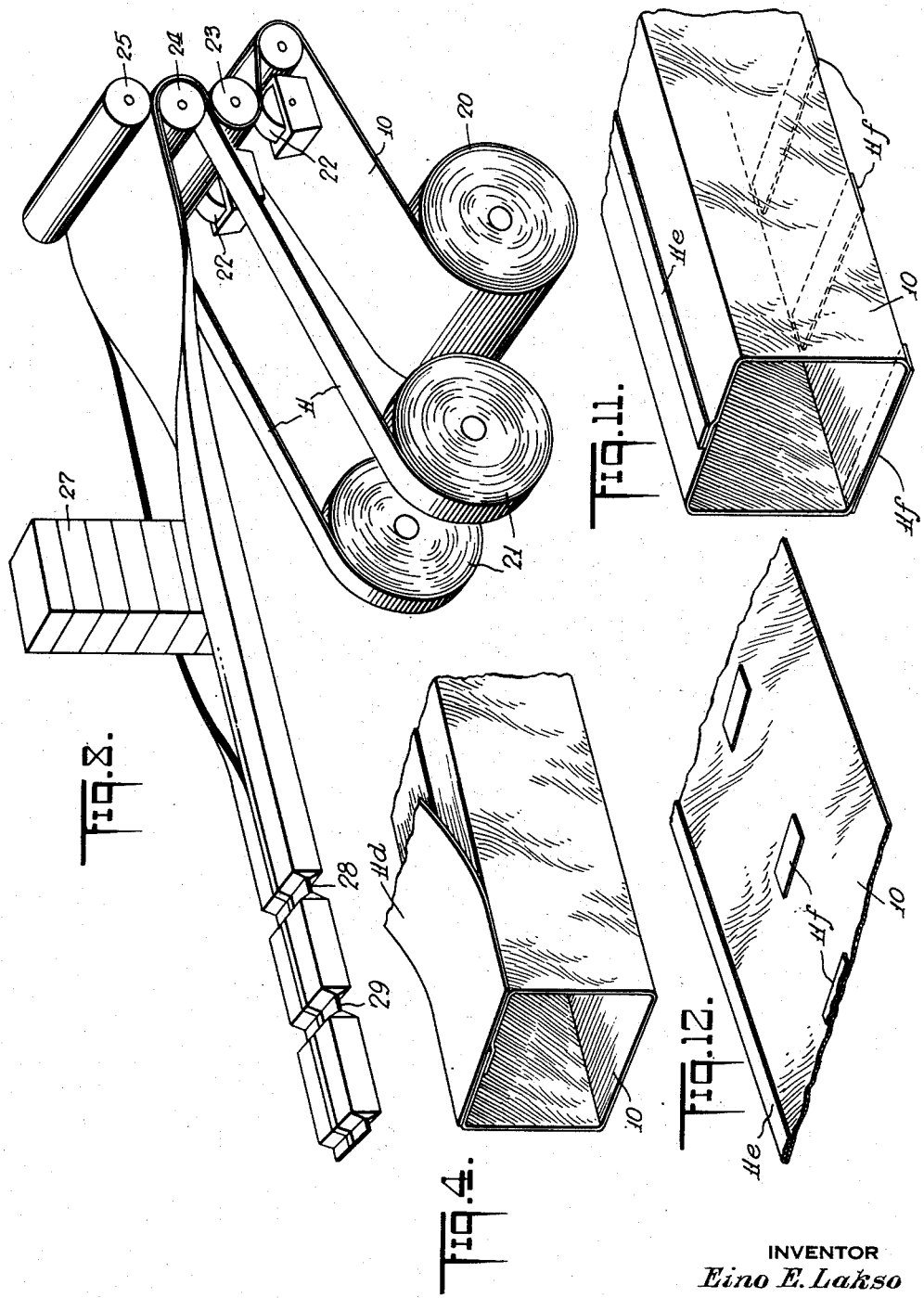

Patented Jan. 12, 1943

2,307,890

UNITED STATES PATENT OFFICE 2,307,890

METHOD OF FORMING CASINGS, BAGS, OR THE LIKE

Eino E. Lakso, Fitchburg, Mass., assignor, by mesne assignments, to Clarence W. Vogt, Norwalk, Conn.

Original application September 20, 1935, Serial No. 41,345. Divided and this application October 18, 1939, Serial No. 299,934

4 Claims. (Cl. 93—35)

This application is a division of my prior copending patent application 41,345, filed September 20, 1935, and in which there is claimed the laminated sheet material and articles made therefrom.

This invention relates to enclosing casings, packages formed by the use of said casings, and wrapping material for use in making said casings and packages. The casings may be employed for enclosing and/or protecting a wide variety of materials including liquids such as oil, milk, etc., plastics, such as salad dressings, gels, fats, etc., and solid materials such as bread, cakes, and other food products, and other products which it may be desired to enclose or protect.

The materials to be enclosed or protected may be such as are to be packaged, stored and/or used at ordinary atmospheric temperature, or may be materials frozen prior to or after being enclosed in the casing. The protection afforded by the wrapping or casing may be to maintain the purity or cleanliness of the encased material, or to protect it against the action of moisture.

Solid materials which may be enclosed or protected may be in a granular, pulverulent or molded state, and include such materials as talcum, salt, sugar and the like.

One of the objects of the invention is to provide an improved method of forming an enwrapment or container which may be filled by any suitable type of filling device, or by hand charging, and in which the charging may take place as the enwrapment or casing is being formed, or after it has been partially formed, or, in the case of pourable materials, after it has been completely formed with a filling opening.

In my improved method, portions of the enwrapment may be readily sealed together by a fusing, vulcanizing or melting of the portions of the sheet itself, a surface coating on said portions, or an impregnated ingredient of said portions, with the provision of a reinforcement of the enwrapment at, around or adjacent to the sealed surfaces, whereby the weakening effect caused by such fusing, vulcanizing or melting is compensated for.

As an example of a material which may be employed as an essential portion of the enwrapment or casing, is a material known on the market as "Pliofilm," which is thin, flexible and transparent, and believed to be composed essentially of a rubberoid material, and believed to be a form of chlorinated rubber. This material possesses the characteristics of being readily vulcanized, sealed or fused at a temperature of approximately 115° C., such fusing causing a substantial reduction in the tensile strength and in the resistance to stretching at the point of fusing. The fusing, vulcanizing or sealing action takes place only within a relatively narrow temperature range, since a temperature below this range does not cause sufficient softening of the material to insure the forming of a tight seal, and a temperature above this range causes such excessive softening or melting that the material becomes fluid, and either becomes porous in the seal or ceases to exist as a sheet. Furthermore, the application of pressure to the material if heated to too high a temperature, often causes the material to adhere to the pressure applying mechanism, or to flow away under the pressure.

This material, known as "Pliofilm" due to its homogeneity, does not have its imperviousness to moisture or liquids decreased by folding or creasing, as is the case with sheet material in which the moistureproof characteristic is obtained by the application of a surface coating which tends to crack or become loose upon repeated bending, flexing, creasing or folding.

Materials other than "Pliofilm" may be employed in carrying out the present invention if possessed of the desired characteristics, namely imperviousness to moisture in spite of repeated bending or creasing, and capability of being sealed by the application of heat and pressure.

The difficulties involved in making enwrapments with sheets of "Pliofilm" have been overcome by means of the present invention, which includes the application to sheets of this or analogous material of lamination or reinforcing layer of a different material which is not injuriously affected by the application of such heat as is required to melt or seal the "Pliofilm," and which will not soften or adhere to the pressure applying mechanism under such heat. A suitable material which may be used for this purpose is paper, although various other sheet materials might be employed, such for instance as cloth, metal foil or the like.

In the accompanying drawings there are illustrated certain forms which the wrapping material may take, as well as certain forms of packages and containers, and a somewhat diagrammatical illustration of a means which may be employed for forming packages and/or sealing together the superposed edges of the wrapping material. It is to be understood that the invention is not limited to these embodiments, as they are merely typical of the invention.

In these drawings:

Fig. 1 is a perspective view of a sheet which may be employed as a wrapper or for making a bag, casing or container.

Fig. 2 is a perspective view of a tubular casing formed from the wrapping shown in Fig. 1.

Fig. 3 is a transverse section on a larger scale, through the seam shown in Fig. 2.

Fig. 4 is a perspective view of another form of casing.

Fig. 5 is a perspective view of another form of tubular casing.

Fig. 6 is a perspective view of a package which may be formed by the use of the wrapping shown in Fig. 1.

Fig. 7 is a perspective view of a portion of the package shown in Fig. 6, but prior to the final sealing of the end thereof.

Fig. 8 is a perspective view showing somewhat diagrammatically mechanism which may be employed for forming the package shown in Fig. 6.

Fig. 9 is a perspective view of another form of laminated sheet.

Fig. 10 is a perspective view of a tubular casing made from the sheets shown in Fig. 9.

Fig. 11 is a perspective view of another tubular casing, and

Fig. 12 is a perspective view of a form of laminated sheet used in making the casing shown in Fig. 11.

In forming a wrapping in accordance with the present invention as illustrated in Fig. 1, there is employed a sheet 10 of the thin, flexible, transparent material which is capable of vulcanizing, sealing or fusing by the application of heat. This sheet will hereinafter be referred to as "Pliofilm," although it is to be understood that such term for the purposes of this case includes any other material having similar characteristics and which is preferably, but not necessarily, of a rubber compound which is believed to be a form of chlorinated rubber.

The sheet is cut of a width corresponding to the size or volume of the material to be wrapped or enclosed, and may be of a length determined by the length of the desired completed package or container, or it may be of indefinite length and cut transversely as an incident to the forming of the packages or containers.

Adhesively secured to one surface of the sheet 10 are a pair of strips 11 of a different sheet material and which is not injuriously affected or substantially softened by the application of the heat required to soften and seal the "Pliofilm." These strips, as above indicated, may be of paper, and they may be secured to the "Pliofilm" by partially softening the latter by the action of heat, or may be secured by the use of intermediate adhesives, and the securing may be uniform throughout the areas of the strips or at only small spots or localized areas.

The laminated sheet shown in Fig. 1 may be folded to tubular form, as shown in Fig. 2, with the opposite edge portions of the "Pliofilm" in direct contact and superposed relationship, and with the edge portions of the two strips on the outside, as shown. By the application of heat and pressure to these edge portions of the upstanding seam 12, shown particularly in Fig. 3, the "Pliofilm" between the two strips of paper will soften and seal together, as well as seal directly to the strips of paper, if not already uniformly adhering thereto.

For applying the heat and pressure any suitable support may be applied to one side of the seam and a heated tool or other implement applied to the other side of the seam with the application of the desired pressure. The heat will be transmitted through the outer lamination and soften the "Pliofilm," but because the "Pliofilm" is confined between the two layers of paper it will not flow away, and upon the prompt removal of the heat and pressure the "Pliofilm" will solidify and form a hermetically tight joint.

A package which may be formed by sealing together the edges as shown in Fig. 2 is illustrated in Fig. 6. After the sealing together of the edges before or after the placing or depositing of the product to be enclosed and sealed, the ends of the package may be sealed together. Portions 13 on two sides at the ends may be tucked or folded in, as shown in Fig. 7, and the opposite sides brought together with folded sections 14 therebetween. These infolded sections, together with terminal portions 15 and 16, are then squeezed together and heat applied. By supporting the portion 15 of the "Pliofilm" and applying the heat and pressure through the paper covering one surface of the portion 16, these superposed layers may be hermetically sealed together. The paper on the under side of the end portion 16 will prevent the direct contact of the heating and pressing tool to the "Pliofilm."

If the package to be formed be rectangular in cross-section, it is preferably that the strips 11 be of such width as to form not only the seal, but to conjointly cover one side of the casing, and therefore one side of the package. If the product to be encased have different top and bottom surfaces, such for instance as is the case with a loaf of bread, it is preferable that the loaf be enclosed so that the bottom will come in contact with the side which is protected by the strips 11, so that the bottom of the casing will be thicker and heavier than the remaining portion, and the top and sides of the casing will be transparent to expose to view the contents of the package.

Merely as an example of a mechanism and method which may be employed for forming such packages as shown in Fig. 6, attention is called to Fig. 8. The sheet 10 of "Pliofilm" of the desired width may be delivered from a roll 20, and the separate strips 11 of the paper may be delivered from rolls 21. The sheet 10 may pass over adhesive applying rollers 22 to apply adhesive adjacent to the edges thereof, and may be pressed against the surface of the strips 11 by rollers 23 and 24, and again by the roller 24 and a pressure and feed roller 25. Solid articles 27 may be delivered to the upper side of the sheet 10, the strips 11 being upon the under side. The laminated sheet is passed through any suitable forming means which will bring it first to channel shape and then bring the edges together to form the seam shown in Fig. 3, and to form a tube encircling the articles which may be fed laterally from the bottom of a stack or column, one at a time, and in spaced relationship. As the tubular casing with the spaced articles therein advances intermittently or continuously, the seam is folded down, tucking and pressing mechanism forms the transverse seam 28, and cutting mechanism severs the packages apart along the line 29 and midway between the opposite edges of the seam 28.

The details of the tube forming, folding and tucking, sealing, and cutting mechanisms form no portion of the present invention, and therefore have not been illustrated. A preferred form of mechanism for performing these operations in proper timed relationship, forms the subject matter of a separate application.

In the tubular casing shown in Fig. 2 the seam is an upstanding one so that the heating and pressing mechanism may be entirely outside of the casing.

In the construction shown in Fig. 5 there is employed a sheet 10 of "Pliofilm" which is bent to channel shaped form with inwardly extending flanges 40 which may lie in the same plane. A second and separate laminated sheet made of an inner layer 10a of "Pliofilm" and outer layer 11 of paper may be applied to form the fourth side of the casing. The layers 10a and 11 may be adhesively secured together and the forming of the casing obtained by applying heat and pressure to the two corner seams, the heat being applied through the paper sheet 11.

Another form of laminated sheet is shown in Fig. 9, in which there is the "Pliofilm" sheet 10 and strips 11b, 11c. One of these is shown as extending to the edge of the sheet 10 and the other as being narrower and spaced a short distance from the opposite edge of the sheet 10. This laminated sheet may be folded to form the tubular casing as illustrated in Fig. 10. With this arrangement the edge portions of the "Pliofilm" sheet overlap, while the edge portions of the paper strips substantially abut. The seam may be formed by the application of heat and pressure similar to that employed in forming the tubular casing shown in Figs. 4 and 5.

The construction shown in Fig. 10 is similar to that shown in Fig. 2, in that the paper covers substantially all of one side of the casing, and may constitute the bottom of the package.

Another way in which the same general result may be obtained is indicated in Fig. 4. The "Pliofilm" sheet 10 is folded the same as in Fig. 10, but the paper strip 11d is not applied until after the edges of the "Pliofilm" have been brought together, and is then adhesively secured in place. The sealing together of the overlapped edges of the "Pliofilm" sheet may be done in the same manner as in Fig. 10, and after the sheet 11d has been applied.

The laminated sheet may be made as shown in Fig. 12. In this case there is only a single strip 11e of paper and spaced transversely extending strips 11f intermediate of the side edges of the sheet 10 and separated lengthwise to distances determined by the length of the desired package. The sheet may be folded to tubular form as shown in Fig. 11, with the strips 11f along the bottom. After this tube has been filled, either as shown in Fig. 8 or in any other suitable manner, the tube is folded and pressed together along lines determined by the position of the strips 11f. From the standpoint of sealing, it is only necessary that the strips 11f cover the portions of the "Pliofilm" layers which are to be sealed together, and in making packages from the casings shown in Fig. 11 the package would not have the opaque reinforced bottom shown in Figs. 9 and 10.

Various other embodiments of the invention may be employed, and the tubular casings shown in Figs. 2, 4, 5, 10 and 11 may be filled with liquid or with any other desired material. The end of the casing may be closed and sealed before the material is inserted, instead of forming the casing around the material, as indicated in Fig. 8.

Where both layers of the "Pliofilm" or analogous heat sealing material are held between two layers of the outer protecting, supporting, or reinforcing material, the heat may be applied to both of the outer layers so that both of the inner layers will be softened, and not only fused or vulcanized together, but also caused to firmly adhere to the two outer layers. Even though an an excessive amount of heat be applied to the outer layers, and to such an extent as to practically liquefy the inner layers, the latter will be held in place and will not readily flow out from between the outer layers. The instant the heat is removed the inner layers will solidify. As the outer layers are preferably of a poor heat conducting material, the heat will not spread to the point of liquefying or injuriously softening the portions of the inner layer beyond the area in direct contact with the heating means.

In forming a seam, such for instance as is shown in Figs. 3, 4 and 5, it will be noted that the outer layers diverge and thus tend to aid in spreading the heat applied to form the seam and prevent the undue softening of the portions of the inner layer extending inwardly from the seam.

The loss of tensile strength of the inner material resulting from its softening or actual melting, is compensated for by the additional strength imparted to the structure at the seam by means of the thicker, stronger and tougher outer layers. The outer layers serve not only as reinforcements for the seam, but as insulators to prevent direct contact of the heating means with the heating, sealing material, and also as supports for the layers which are to be sealed together.

If the seam is to be formed where there is only one outer layer of the non-heat sealing material, for instance at the ends of the package shown in Fig. 6, or in forming the seam shown in Fig. 5, it is desirable that the heat be applied from only one side, and through the outer insulating, supporting and reinforcing layer. The support for the layer of the heat sealing material which is not so protected, for instance the under side shown at the end of Fig. 6 and the inner side shown in Fig. 5, should be of such a character that it does not remain for any appreciable length of time in contact with said material at any one point, and peels therefrom. A suitable support which may serve for applying the desired pressure may be a roller which rolls along the seam, as distinguished from a block having a flat surface pressed directly against the same. Other forms of non-heating supports moving along or rolling over the material may be employed.

Having thus described my invention, what I claim as new and desire to secure by Letters Patent is:

1. The method of forming a multiply bag which consists in sealing together superimposed thermoplastic plies of opposite edge portions of a sheet, by means of heat transmitted thereto through an outer ply of non-thermoplastic material united therewith, while simultaneously holding said thermoplastic plies in contact to thereby form a tube, and thereafter closing one end of said tube.

2. The method of forming a wrapping casing, bag or the like, which includes securing strips of thin, flexible, non-fusible sheet material to the surface of a sheet of thin, flexible, fusible material, along opposite edge portions of the latter, folding said sheet to form a tube rectangular in cross-section, with said strips only on one side, and heat sealing the last mentioned edge portions together between said strips.

3. The method of forming a wrapping casing, bag, or the like, which includes securing a pair of thin, flexible strips of sheet material to the surface of a thin, flexible sheet of a different material along opposite edge portions of said sheet, each of said strips being approximately one-eighth of the width of said sheet, folding said sheet to form a tube, rectangular in cross-section, bringing together in superposed relationship the opposite edge portions of said sheet, and applying heat and pressure to said strips to seal together said edge portions.

4. The method of forming a wrapping casing, bag, or the like, which includes securing strips of paper to the surface of a sheet of thin, flexible, transparent rubberoid material, along opposite edge portions of the latter, folding said sheet to form a tube rectangular in cross-section, with said strips on the same side thereof and entirely covering said side, and sealing together the edge portions of said sheet in superposed relationship by the application of heat through said strip of paper.

EINO E. LAKSO.